United States Patent
Courth et al.

(10) Patent No.: US 11,143,216 B2
(45) Date of Patent: Oct. 12, 2021

(54) FILTER SUBASSEMBLY FOR MOTOR VEHICLE BRAKE SYSTEMS

(71) Applicant: Continental Teves AG & Co. oHG, Frankfurt (DE)

(72) Inventors: Christian Courth, Frankfurt (DE);
Heiko Gastauer, Frankfurt (DE);
Heiko Gensert, Frankfurt (DE);
Christian Schulz, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/555,317

(22) Filed: Aug. 29, 2019

(65) Prior Publication Data

US 2019/0383314 A1    Dec. 19, 2019

Related U.S. Application Data

(63) Continuation of application No. PCT/EP2018/054991, filed on Mar. 1, 2018.

(30) Foreign Application Priority Data

Mar. 17, 2017   (DE) .................... 10 2017 204 502.7
Oct. 19, 2017   (DE) .................... 10 2017 218 687.9

(51) Int. Cl.
  *F15B 21/041*   (2019.01)
  *B01D 29/58*    (2006.01)
  *B01D 29/33*    (2006.01)
  *B60T 17/00*    (2006.01)

(52) U.S. Cl.
  CPC ............ *F15B 21/041* (2013.01); *B01D 29/33* (2013.01); *B01D 29/58* (2013.01); *B60T 17/00* (2013.01)

(58) Field of Classification Search
  CPC ....... F15B 21/041; B01D 29/33; B01D 29/58; B01D 29/44; B01D 29/50; B01D 29/56; B01D 33/35; B01D 33/41; B01D 33/42; B60T 17/00; B60T 17/04; B60T 17/221
  USPC ... 210/338, 342, 315, 497.01, 487, 489, 499
  See application file for complete search history.

(56) References Cited

U.S. PATENT DOCUMENTS

| | | |
|---|---|---|
| 3,087,560 A | 4/1963 | Dodson |
| 6,387,261 B1 | 5/2002 | Mojena |
| 2010/0050879 A1 | 3/2010 | Knox |

FOREIGN PATENT DOCUMENTS

| | | | |
|---|---|---|---|
| DE | 809797 C | | 8/1951 |
| EP | 0548910 A1 | | 6/1993 |
| GB | 1574998 | * | 9/1980 |
| GB | 1574998 A | | 9/1980 |
| WO | 2016/107751 A2 | | 7/2016 |

OTHER PUBLICATIONS

Rompp Lexikon Chemie, Stichwort: Filtration, URL: https://roempp.thieme.de/roempp4.0/do/dataRD-06-00828, [recherhiert am Jun. 6, 2018].

(Continued)

*Primary Examiner* — Madeline Gonzalez

(57) ABSTRACT

A filter subassembly, having a first screen comprising a fabric that has mesh elements, the mesh size of which determines how effectively particles are prevented from penetrating therethrough, wherein a second screen is provided at a distance from the first screen, and the two screens are arranged in series.

5 Claims, 2 Drawing Sheets

(56) References Cited

OTHER PUBLICATIONS

Search Report dated Jun. 27, 2018 from corresponding German Patent Application No. 10 2017 218 687.9.
International Search Report and Written Opinion dated Jun. 11, 2018 from corresponding International Patent Application No. PCT/EP2018/054991.
German patent application No. DE 102017203958.2, filed Mar. 10, 2017.

* cited by examiner

Fig. 3
Fig. 4
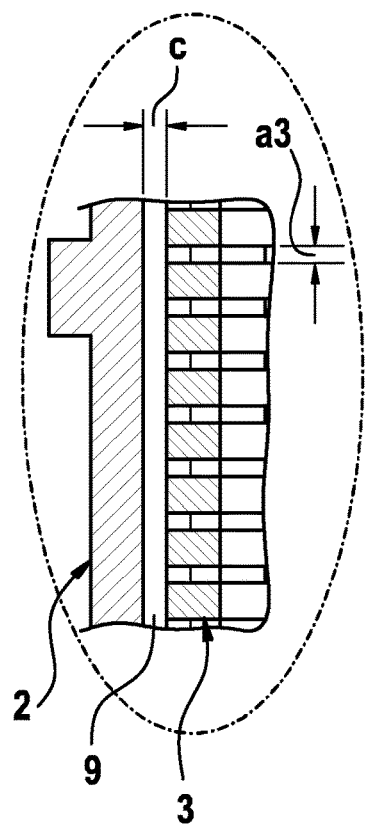
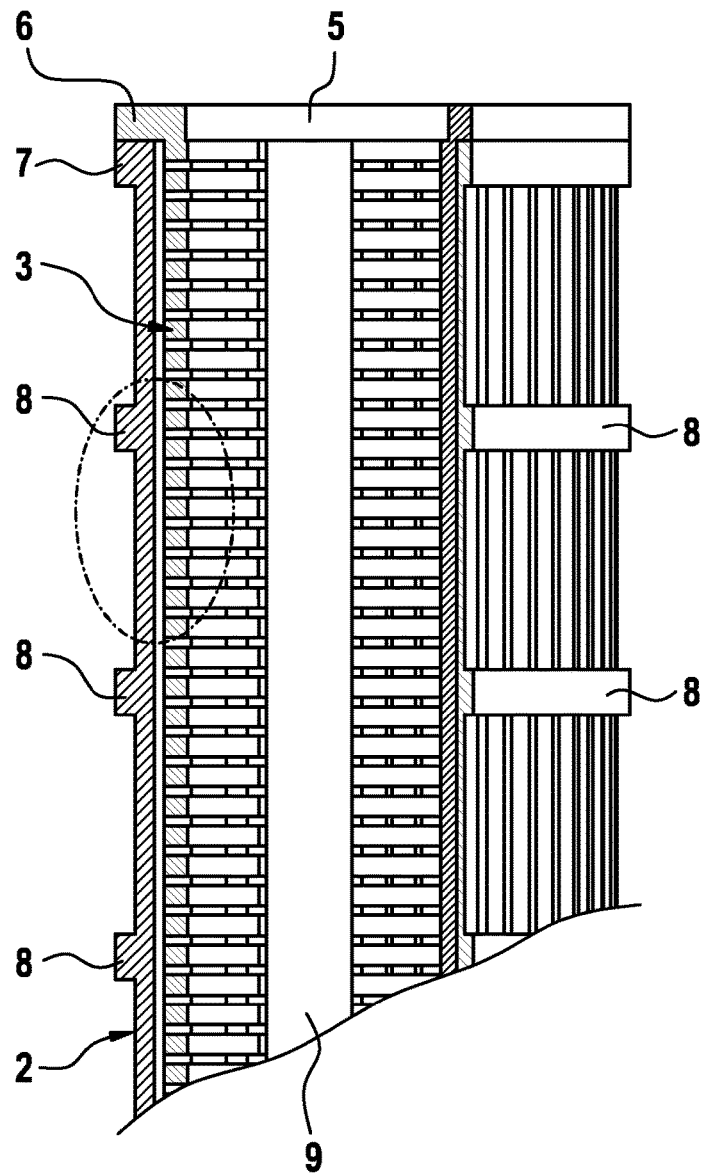

FILTER SUBASSEMBLY FOR MOTOR VEHICLE BRAKE SYSTEMS

CROSS REFERENCE TO RELATED APPLICATIONS

This application is the U.S. national phase application of PCT International Application No. PCT/EP2018/054991, filed Mar. 11, 2018, which claims priority to German Patent Application No. DE 10 2017 204 502.7, filed Mar. 17, 2017, and German Patent Application No. DE 10 2017 218 687.9, filed Oct. 19, 2017 wherein the contents of such applications are incorporated herein by reference.

TECHNICAL FIELD

A filter subassembly for hydraulic motor vehicle brake systems.

TECHNICAL BACKGROUND

Filter subassemblies of the stated type, having a screen comprising a fabric that generally has square mesh elements, the mesh size of which prevents the penetration of unwanted particles (foreign bodies and dirt) if the particle size is greater than the mesh size, have already been disclosed.

In this regard, patent application DE 102017203958.2, which is not a prior publication, relates to a filter subassembly in the form of a ring filter, which is arranged on a solenoid valve within an electrohydraulic motor vehicle brake system.

The disadvantage here is that the square shape of the individual mesh elements of the ring filter limits the proportion of the filtering area of the screen which can be used as a "free area" for through-flow, and therefore the size of the filter and the required installation space generally increase with the through flow requirement. At the same time, it is often not possible to optimize the configuration of the installation space in terms of the depth thereof, owing to the cylindrical shape of the filter fabric.

What is needed is a filter subassembly of the stated type at low cost with the simplest possible functional means, and a filter subassembly which avoids the abovementioned disadvantages.

SUMMARY

A filter subassembly including filter subassembly for hydraulic motor vehicle brake systems, the filter subassembly comprising a cylindrical first screen comprising a fabric that has mesh elements of defined size, the mesh size of which prevents the penetration of unwanted particles, the particle size of which is greater than the mesh size, a second cylindrical screen provided with mesh elements is arranged at a radial distance from the mesh elements of the first cylindrical screen, wherein the two screens are arranged in series.

In one or more embodiments, the mesh elements of the second cylindrical screen extend within the first screen over the entire mesh length thereof.

In one or more embodiments, the first cylindrical screen has rectangular mesh elements with a defined mesh size and a mesh length which exceeds the mesh size.

In one or more embodiments, the second cylindrical screen has rectangular mesh elements with a defined mesh size and a mesh length which exceeds the mesh size.

In one or more embodiments, the rectangular mesh elements of the second screen have an angular offset relative to the rectangular mesh elements of the first screen.

In one or more embodiments, wherein the angular offset of the rectangular mesh elements of the second screen is 90 angular degrees relative to the rectangular mesh elements of the first screen.

In one or more embodiments, the second screen has a plurality of longitudinal bars with a defined bar height distributed over the outer circumference of said screen, setting the radial clearance between the mesh elements of the first screen and the mesh elements of the second screen in accordance with the bar height after the insertion of the second screen into the first screen.

In one or more embodiments, both screens have a radial flow direction from the outside inward.

BRIEF DESCRIPTION OF THE DRAWINGS

FIG. 3 shows a longitudinal section through a segment of the filter subassembly on an enlarged scale in order to illustrate the mesh elements and the radial clearance between the two screens, according to one or more embodiments; and FIG. 4 shows a segment of the filter subassembly according to FIG. 1 illustrated partially in longitudinal section.

These and other embodiments, aspects, advantages, and features of the present invention will be set forth in part in the description which follows and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Figure 1:
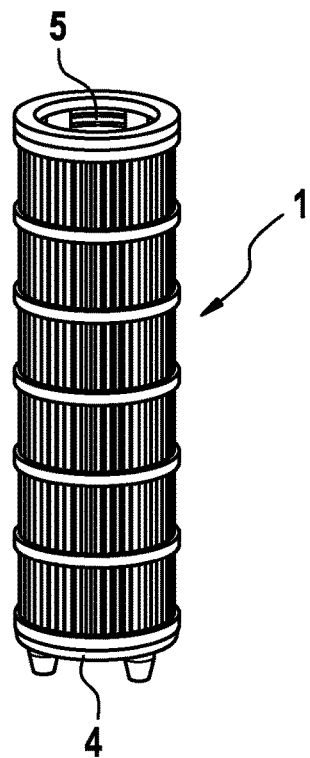
FIG. 1 shows an external view of the filter subassembly according to one or more embodiments, produced from two cylindrical screens, in a perspective illustration.

FIG. 1 shows, in a perspective view, a finished cylindrical filter subassembly 1, which is used to filter brake fluid in hydraulic motor vehicle brake systems. On the underside, the filter subassembly 1 has a closed bottom 4 and, diametrically opposite the latter, an opening 5, and therefore a radial entry via the mesh elements in the lateral surface of the filter subassembly 1 and an axial exit via the coaxial opening 5 are the only possibilities provided for flow through the filter subassembly.

Figure 2:
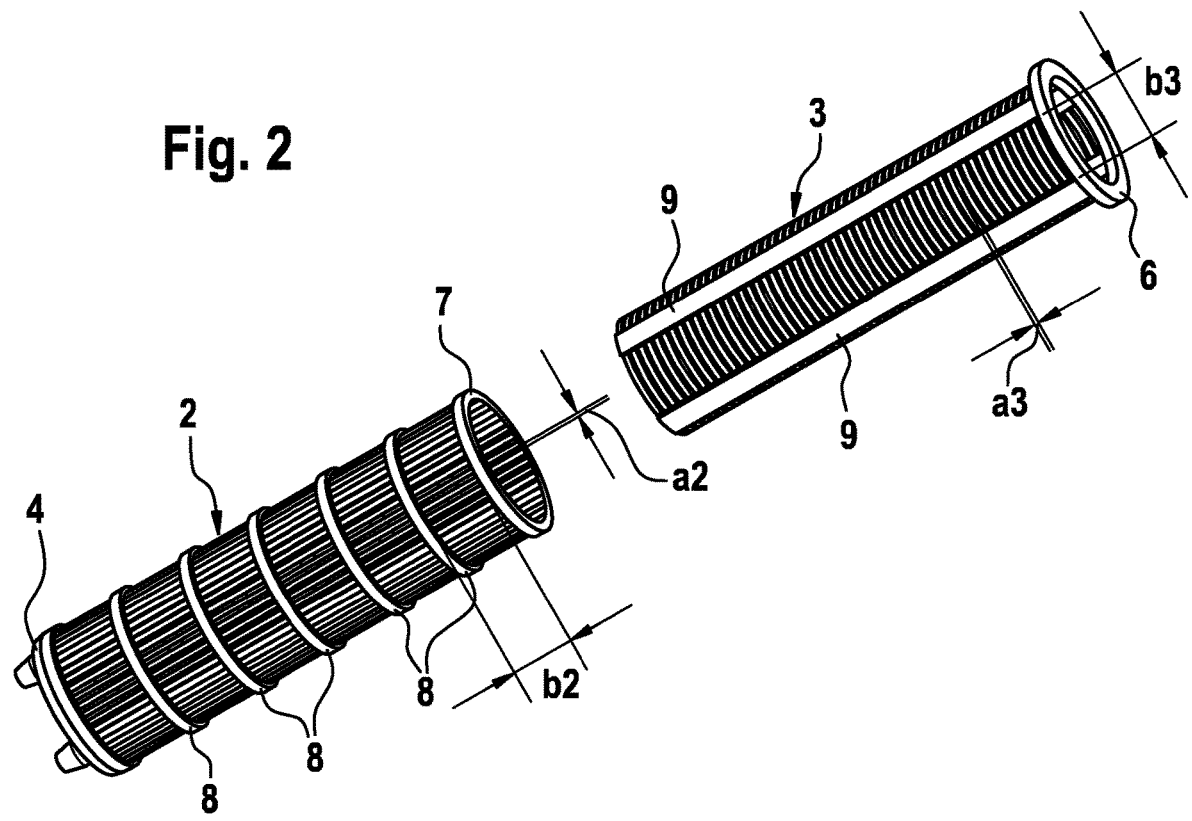
FIG. 2 shows the filter subassembly before production in an exploded view of the two screens to be fitted one inside the other, according to one or more embodiments.

To clarify the details of the filter subassembly 1, attention is drawn to the exploded illustration in FIG. 2, according to which the filter subassembly 1 consists of two hollow-cylindrical screens 2, 3, which each have, along the lateral surface thereof, a fabric which is provided with mesh elements and the mesh size of which prevents the penetration of particles if the particle size thereof exceeds the mesh size.

As can be seen by a combined examination of FIG. 1 and FIG. 2, the filter subassembly 1 is produced by fitting the two screens 2, 3 coaxially one inside the other as far as a collar 6, 7 forming a stop, provided respectively at the open end of each of the two screens 2, 3.

As can furthermore clearly be seen from FIG. 2, the first screen 2 has rectangular mesh elements with a defined mesh size a2 and a mesh length b2 exceeding the mesh size a2, and the second screen 3 also has rectangular mesh elements with a defined mesh size a3 and a mesh length b3 exceeding the mesh size a3.

For the sake of an optimum filtering action, the rectangular mesh elements of the second screen 3 are arranged transversely to the rectangular mesh elements of the first screen 2 and are offset by 90 angular degrees thereto, with the result that all the rectangular mesh elements of the first screen 2, are oriented as "longitudinal mesh elements" in the direction of the longitudinal axis of the filter subassembly 1, while all the rectangular mesh elements of the second screen 3 are aligned as "transverse mesh elements", at right angles to the longitudinal axis of the filter subassembly 1, for details of which attention is drawn particularly to the illustration in FIGS. 2 and 4.

Moreover, it is clear from FIGS. 2 and 3 that the second screen 3 has a plurality of longitudinal bars 9 with a defined bar height distributed over the outer circumference of said screen, thus setting a required radial clearance c between the two screens 2, 3 in accordance with the selected bar height after the insertion of the second screen 3 into the first screen 2.

As regards the through flow effect, the radial clearance c advantageously has the effect that the radial flow through screen 2 and screen 3 is like that with an in-series arrangement of two screens of larger mesh size, something that cannot be achieved when compared with a conventional radial flow screen that has the conventional square mesh size.

As regards the filtering action, it should be noted that, in the case of radial flow through the filter subassembly 1 from the outside inward, a particle with a particle thickness less than the mesh size a2 can pass through the outer first screen 2 and, after crossing the radial clearance c, strikes the inner second screen 3 of the filter subassembly. As long as the particle length is greater than the radial clearance c, the particle remains aligned in the first screen 2, and therefore it can only pass through the second screen 3 if its particle thickness is less than the mesh size a3. A screening effect corresponding to fabric dimensioning with a mesh size a2 of the first screen 2 multiplied by the mesh size a3 (i.e. a2×a3) is thereby advantageously obtained for particles with a length which is greater than the radial clearance c. Consequently, an in-series arrangement of two screens 2, 3 with a larger mesh through flow area in comparison with a previously customary single screen with a square mesh through flow area is obtained.

Finally, on the basis of the view in FIG. 2, FIG. 4 shows the filter subassembly 1 in partial section, thus clearly showing the longitudinally extending mesh elements of the outer first screen 2 and the mesh elements of the inner second screen 3, which extend transversely thereto. On the outer circumference, in each case at a distance corresponding to the mesh length b2, the first screen 2 is provided with an annular bar 8, and therefore the distance between the annular bars 8 defines the mesh length b2 and ensures excellent dimensional stability. In contrast, the second screen 3 has a longitudinal bar 9 on the outer circumference, in each case at the spacing of the mesh length b3, and therefore the distance between the longitudinal bars 9 defines the mesh length b3 of the second screen 3 and thus ensures very good dimensional stability of the second screen 3. As will be apparent when viewed together with FIG. 2, the distance between two longitudinal bars 9 corresponds here to the distance between two annular bars 8 in one or more embodiments.

The following advantages are achieved: while retaining the previous overall size of the filter, a higher through flow is possible by virtue of the indicated arrangement and embodiment of the two screens 2, 3, or it is even possible to reduce the size of the filter subassembly without having to accept sacrifices as regards the previous flow rate in comparison with already established filter subassemblies. With the indicated embodiment and alignment of the mesh elements, the screens 2, 3 can be produced at low cost by injection molding plastics ("molded mesh"). To produce the filter subassembly, the two screens 2, 3 can be aligned relative to one another in the axial direction using simple tools and fitted together without complex orientation. Numerous possibilities are obtained for the further refinement of the filter subassembly, especially for optimizing the strength of the filter subassembly through the indicated configuration of the mesh elements and of the annular and longitudinal bars 8, 9.

In one or more embodiments, a filter subassembly can be made suitable for relatively high flow rates with the same or a reduced installation space requirement, it is now proposed that the previously known single screen provided with square mesh elements should be replaced by an in-series arrangement of two screens having rectangular mesh elements, wherein the two screens have a defined radial clearance with respect to one another.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF REFERENCE SIGNS

1 Filter subassembly
2 Screen
3 Screen
4 Bottom
5 Opening
6 Collar
7 Collar
8 Annular bar
9 Longitudinal bar
a2 Mesh size
a3 Mesh size
b2 Mesh length
b3 Mesh length
c Radial clearance

The invention claimed is:

1. A filter subassembly for hydraulic motor vehicle brake systems, the filter subassembly comprising:
a first cylindrical screen comprising:
a first plurality of mesh elements oriented in an axial direction of the first cylindrical screen;
a closed bottom disposed as a first base of the first cylindrical screen coupled to the first plurality of mesh elements; and
a plurality of annular bars disposed radially on an outer circumference of the first plurality of mesh elements at distances corresponding to a mesh length of the first plurality of mesh elements; and
a second cylindrical screen comprising:
a second plurality of mesh elements oriented in a radial directions of the second cylindrical screen,
a plurality of longitudinal bars disposed in an axial direction of the second cylindrical screen on an outer circumference of the second plurality of mesh elements at distances corresponding to a mesh length of the second plurality of mesh elements; and
a collar disposed around a coaxial opening at a second base of the second cylindrical screen opposite of the first base of the first cylindrical screen,
wherein the second cylindrical screen is fitted coaxially inside the first cylindrical screen and a height of the plurality of longitudinal bars corresponds to a radial clearance between the first plurality of mesh elements and the second plurality of mesh elements.

2. The filter subassembly as claimed in claim 1, wherein the second plurality of mesh elements of the second cylindrical screen extend over an entire length of the second cylindrical screen.

3. The filter subassembly as claimed in claim 1, wherein the second plurality of mesh elements of the second cylindrical screen are offset relative to the first plurality of mesh elements of the first cylindrical screen.

4. The filter subassembly as claimed in claim 3, wherein the offset is 90 angular degrees.

5. The filter subassembly as claimed in claim 1, wherein a flow direction of the filter subassembly is a radial entry via the first plurality of mesh elements and the second plurality of mesh elements in a lateral surface of the filter subassembly and exit via the coaxial opening.

* * * * *